United States Patent
Schetzel

(10) Patent No.: US 10,563,523 B2
(45) Date of Patent: Feb. 18, 2020

(54) METHOD FOR FABRICATING A CERAMIC MATRIX COMPOSITE ROTOR BLADE

(71) Applicant: Rolls-Royce Corporation, Indianapolis, IN (US)

(72) Inventor: Tara Grant Schetzel, Indianapolis, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 850 days.

(21) Appl. No.: 15/084,380

(22) Filed: Mar. 29, 2016

(65) Prior Publication Data

US 2016/0312626 A1 Oct. 27, 2016

Related U.S. Application Data

(60) Provisional application No. 62/144,720, filed on Apr. 8, 2015.

(51) Int. Cl.
*F01D 5/28* (2006.01)
*C04B 35/622* (2006.01)
(Continued)

(52) U.S. Cl.
CPC ............ *F01D 5/282* (2013.01); *C04B 35/111* (2013.01); *C04B 35/18* (2013.01); *C04B 35/573* (2013.01);
(Continued)

(58) Field of Classification Search
CPC .......... F01D 5/282; F01D 5/147; F01D 5/284; F01D 5/225; C04B 35/62227;
(Continued)

(56) References Cited

U.S. PATENT DOCUMENTS 2,979,809 A * 4/1961 Dennis .................. B21D 53/78
29/889.721
3,200,477 A * 8/1965 Shultz .................. B64C 27/473
29/889.72
(Continued)

FOREIGN PATENT DOCUMENTS

EP 2767698 A1 8/2014
EP 2837796 A1 2/2015

OTHER PUBLICATIONS

Response to Extended Search Report dated Aug. 31, 2016, from counterpart European Application No. 16163592.5, filed Apr. 10, 2017, 9 pp.
(Continued)

*Primary Examiner* — Michael N Orlando
*Assistant Examiner* — Christian Roldan
(74) *Attorney, Agent, or Firm* — Shumaker & Sieffert, P.A.

(57) ABSTRACT

A method for making a turbine engine blade includes three-dimensionally weaving elongate fibers of a material selected from the group consisting of carbon, glass, silica, silicon carbide, silicon nitride, aluminum, aramid, aromatic polyamide, and combinations thereof to create a woven preform including a single piece of woven material. The woven preform includes continuous warp fibers extending along a first direction, continuous weft fibers extending along a second direction substantially normal to the first direction, and continuous fibers extending in a third direction substantially normal to the first and the second directions. The woven preform includes an airfoil region extending along the first direction and an arrangement of flaps extending along the second direction. The flaps are folded into a plane substantially normal to a plane of the airfoil
(Continued)

region to form a shaped woven preform. The shaped woven preform is densified with a ceramic matrix.

12 Claims, 5 Drawing Sheets

(51) Int. Cl.
*F01D 5/22* (2006.01)
*C04B 35/80* (2006.01)
*C04B 35/58* (2006.01)
*C04B 35/111* (2006.01)
*C04B 35/18* (2006.01)
*C04B 35/573* (2006.01)
*C04B 35/591* (2006.01)
*C04B 35/597* (2006.01)
*C04B 35/82* (2006.01)
*C04B 35/76* (2006.01)
*F01D 5/14* (2006.01)

(52) U.S. Cl.
CPC ...... *C04B 35/58092* (2013.01); *C04B 35/591* (2013.01); *C04B 35/597* (2013.01); *C04B 35/62227* (2013.01); *C04B 35/76* (2013.01); *C04B 35/803* (2013.01); *C04B 35/806* (2013.01); *C04B 35/82* (2013.01); *F01D 5/147* (2013.01); *F01D 5/225* (2013.01); *F01D 5/284* (2013.01); *C04B 2235/524* (2013.01); *C04B 2235/5216* (2013.01); *C04B 2235/5224* (2013.01); *C04B 2235/5228* (2013.01); *C04B 2235/5232* (2013.01); *C04B 2235/5244* (2013.01); *C04B 2235/5248* (2013.01); *C04B 2235/5252* (2013.01); *C04B 2235/5268* (2013.01); *C04B 2235/616* (2013.01); *C04B 2235/77* (2013.01); *F05D 2220/32* (2013.01); *F05D 2230/20* (2013.01); *F05D 2240/30* (2013.01); *F05D 2300/6033* (2013.01); *F05D 2300/6034* (2013.01); *Y02T 50/672* (2013.01)

(58) Field of Classification Search
CPC . C04B 35/76; C04B 35/58092; C04B 35/573; C04B 35/806; C04B 35/111; C04B 35/591; C04B 35/597; C04B 35/803; C04B 35/18; C04B 35/82; C04B 2235/5268; C04B 2235/5232; C04B 2235/524; C04B 2235/5224; C04B 2235/5228; C04B 2235/5216; C04B 2235/77; C04B 2235/616; C04B 2235/5252; C04B 2235/5248; C04B 2235/5244; Y02T 50/672; F05D 2240/30; F05D 2230/20; F05D 2220/32; F05D 2300/6033; F05D 2300/6034
USPC .......................................... 156/286
See application file for complete search history.

(56) References Cited

U.S. PATENT DOCUMENTS

| | | | |
|---|---|---|---|
| 3,606,850 A * | 9/1971 | Price et al. | B21D 43/24 220/200 |
| 3,731,360 A | 5/1973 | Stone, Jr. | |
| 4,966,527 A | 10/1990 | Merz | |
| 5,268,058 A * | 12/1993 | Cornwell | B29C 65/18 156/290 |
| 5,292,231 A | 3/1994 | Lauzeille | |
| 6,196,794 B1 | 3/2001 | Matsumoto | |
| 6,676,373 B2 | 1/2004 | Marlin et al. | |
| 7,101,154 B2 * | 9/2006 | Dambrine | B29C 70/48 29/889.71 |
| 7,300,255 B2 | 11/2007 | Potter et al. | |
| 7,510,379 B2 | 3/2009 | Marusko et al. | |
| 8,206,118 B2 | 6/2012 | Propheter-Hinckley et al. | |
| 8,235,670 B2 | 8/2012 | Morrison et al. | |
| 8,607,454 B2 * | 12/2013 | Blanchard | B29C 70/24 156/148 |
| 8,794,925 B2 | 8/2014 | McCaffrey | |
| 8,846,147 B2 | 9/2014 | Eberling-Fux et al. | |
| 9,708,226 B2 * | 7/2017 | Lazur | C04B 41/87 |
| 9,708,918 B2 * | 7/2017 | Fremont | F01D 5/282 |
| 2006/0284337 A1 * | 12/2006 | Subramanian | C04B 35/573 264/258 |
| 2011/0293828 A1 * | 12/2011 | Eberling-Fux | B29B 11/16 427/249.2 |
| 2012/0099982 A1 | 4/2012 | Coupe et al. | |
| 2014/0030076 A1 | 1/2014 | Nunez et al. | |
| 2015/0040396 A1 | 2/2015 | Fremont et al. | |
| 2015/0044050 A1 | 2/2015 | Thomas et al. | |

OTHER PUBLICATIONS

Extended Search Report from counterpart European Application No. 16163592.5, dated Aug. 31, 2016, 11 pp.

* cited by examiner

METHOD FOR FABRICATING A CERAMIC MATRIX COMPOSITE ROTOR BLADE

This application claims the benefit of U. S. Provisional Application No. 62/144,720 filed Apr. 8, 2015, which is incorporated herein by reference in its entirety.

BACKGROUND

In a combustion turbine engine, which may include power generating, aircraft or other engine types, pressurized air is used to combust a fuel to generate a flow of hot combustion gases, which is then directed through one or more turbines that extract energy. In the turbine, rows of circumferentially spaced turbine rotor blades extend radially outwardly from a supporting rotor disc. Each blade typically includes a dovetail that permits assembly and disassembly of the blade in a corresponding dovetail slot in the rotor disc, as well as an airfoil that extends radially outwardly from the dovetail and interacts with the flow of the working fluid through the engine. The airfoil has a pressure side and suction side extending axially between corresponding leading and trailing edges and radially between a root portion and a tip portion. The blade tip may include a radially outer turbine shroud to minimize leakage of the combustion gases flowing downstream between the turbine blades.

Ceramic matrix composite (CMC) materials can sustain higher temperatures than traditional metal alloys, and can be used in turbine engines where higher fuel efficiencies can be attained with higher temperatures. The amount of cooling air required to operate a metal component can be reduced when a CMC component is used. In addition, CMC materials are less dense that metals, which can provide weight savings and improve fuel efficiency.

SUMMARY

In general, the present disclosure is directed to a simple and low-cost method for making a three-dimensionally woven preform that can be densified to form a CMC turbine engine blade.

In one aspect, the present disclosure is directed to a method for making a turbine engine blade, including:

three-dimensionally weaving elongate fibers of a material selected from the group consisting of carbon, glass, silica, silicon carbide, silicon nitride, aluminum, aramid, aromatic polyamide, and combinations thereof to create a woven preform comprising a single piece of woven material, wherein the woven preform includes continuous warp fibers extending along a first direction, continuous weft fibers extending along a second direction substantially normal to the first direction, and continuous fibers extending in a third direction substantially normal to the first and the second directions; and wherein the woven preform includes an airfoil region extending along the first direction and an arrangement of flaps adjacent to the airfoil region;

folding the flaps into a plane substantially normal to a plane of the airfoil region to form a shaped woven preform; and densifying the shaped woven preform with a ceramic matrix to obtain a ceramic matrix composite (CMC) turbine engine blade.

In another aspect, the present disclosure is directed to a method for making a turbine engine blade, including:

three-dimensionally weaving elongate ceramic fibers to create a unitary woven preform including continuous warp fibers extending along a first direction, continuous weft fibers extending along a second direction substantially normal to the first direction, and continuous fibers extending in a third direction substantially normal to the first and the second direction; and wherein the woven preform includes an airfoil region extending along the first direction, a first pair of flaps at a first end of the airfoil region, and a second pair of flaps at a second end of the airfoil region opposite the first end thereof;

folding the first pair of flaps into a plane substantially normal to a plane of the airfoil region to form an inner platform region on the first end of the airfoil region;

folding the second pair of flaps into a plane substantially normal to the plane of the airfoil region to form an outer platform region on the second end of the airfoil region;

attaching the woven preform to metal tooling; and densifying the woven preform with a ceramic matrix to obtain a ceramic matrix composite (CMC) turbine engine blade.

The woven preform of this disclosure is a unitary piece of woven material that can be quickly and consistently produced at a low cost using a three-dimensional weaving apparatus. The interlocking weave of the unitary preform is free of complex joints and seams, which can concentrate stress and originate cracks in a CMC turbine engine blade during extended periods of service in turbine engine.

The details of one or more embodiments of the invention are set forth in the accompanying drawings and the description below. Other features, objects, and advantages of the invention will be apparent from the description and drawings, and from the claims.

BRIEF DESCRIPTION OF DRAWINGS

Like symbols in the drawings indicate like elements.

DETAILED DESCRIPTION

Figure 1:
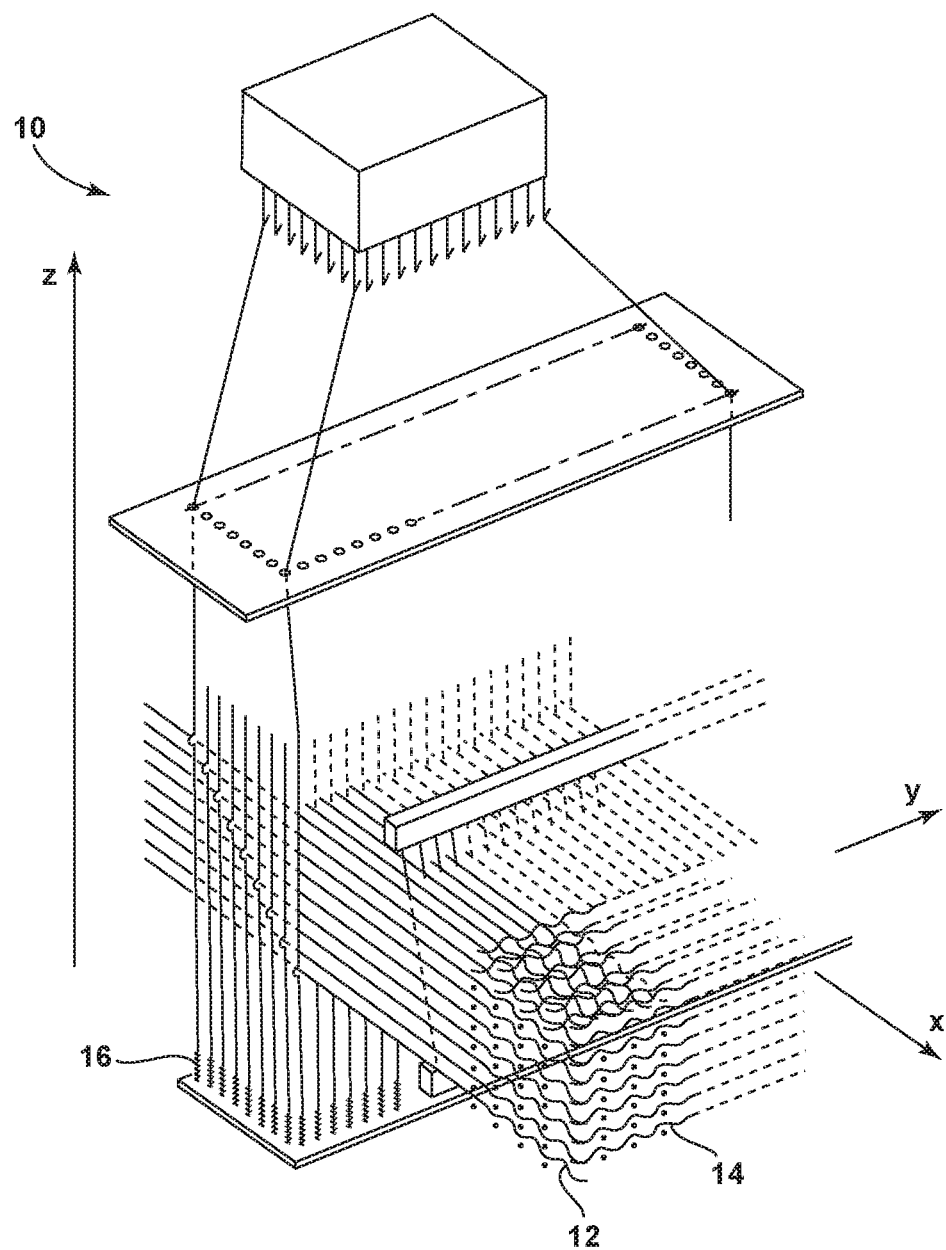
FIG. 1 is a schematic diagram of a loom capable of weaving a turbine engine blade preform in three dimensions.

CMC turbine engine blades have been made by fabricating a fiber preform using a three-dimensional weaving apparatus shown schematically in FIG. 1. In FIG. 1, a Jacquard-type loom 10 capable of making a fiber preform includes warp yarns 12 mounted thereon that are oriented in a first direction, which is designated as the longitudinal x-direction in FIG. 1. The loom 10 further includes weft yarns 14 oriented along a second direction normal to the first direction, which is designated as the transverse y-direction in FIG. 1. The loom 10 also includes yarns 16 extending along a third z-direction normal to the first and the second directions, which form a plurality of layers. The woven turbine engine blade preform produced by the three-dimensional loom 10 can then be shaped and densified to obtain a CMC turbine engine blade.

Figure 2:
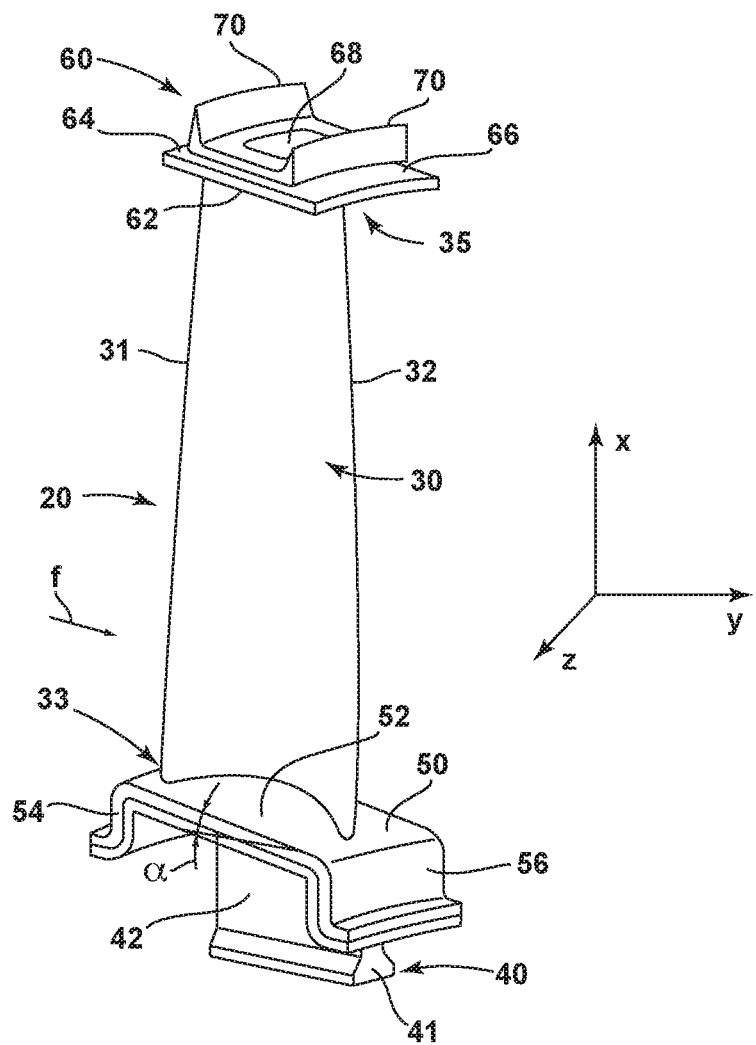
FIG. 2 is a perspective view of a turbine engine blade.

FIG. 2 illustrates a turbine engine blade 20 including an airfoil 30, a root 40 including a bulb-shaped portion 41 of greater thickness. The root 40 is extended by a tang 42. A radially inner end of the blade 20 includes an inner platform 50 between the tang 42 and the airfoil 30, and radially outer end of the blade 20 includes an outer platform 60.

The airfoil 30 extends in a longitudinal x-direction between the inner platform 50 and the outer platform 60 and in cross-section includes a curved profile of varying thickness between a leading edge 31 and a trailing edge 32 thereof.

The blade 20 is mounted on a turbine rotor (not shown in FIG. 2) by engaging the root 40 in a housing in the periphery of the rotor. The root 40 is extended by the tang 42 to connect with the inner (or bottom) face of the inner platform 50, which extends generally along a y-direction substantially perpendicular to the plane of the airfoil 30. At its radially inner end 33, the airfoil 30 is connected to an outer (or top) face 52 of the inner platform 50, which defines the inside of the flowpath through the turbine. In its upstream and downstream end portions (in the flow direction f of the gas stream), the platform is terminated by overhangs 54 and 56. In the non-limiting embodiment of FIG. 2, the face 52 of the inner platform slopes so that overall it forms a non-zero angle α relative to the normal to the longitudinal direction of the blade. Depending on the profile desired for the inside surface of the flowpath, the angle α may be zero, or the face 52 may have a curved profile.

At its radially outer end 35, the airfoil 30 is connected to the outer platform 60 by an inner (bottom) face 62 of the platform that defines the outside of the flowpath. In its upstream and downstream portions, the outer platform is terminated by overhangs 64 and 66. On the outside (on top), the outer platform defines a depression 68. Along the upstream and downstream edges of the depression 68, the platform carries wipers 70 presenting a tooth-shaped profile with tips suitable for penetrating into a layer of abradable material of a turbine ring (not shown in FIG. 2) to reduce the clearance between the tip of the blade and the turbine ring.

In the non-limiting embodiment of FIG. 2, the face 62 of the outer platform extends substantially perpendicularly to the plane of the blade 30. In other embodiments, and depending on the profile desired for the outside surface of the flowpath, the face 62 could be inclined to form overall a non-zero angle relative to the normal to the longitudinal direction of the blade 30, or the face 62 could have a curved profile.

Figure 3:
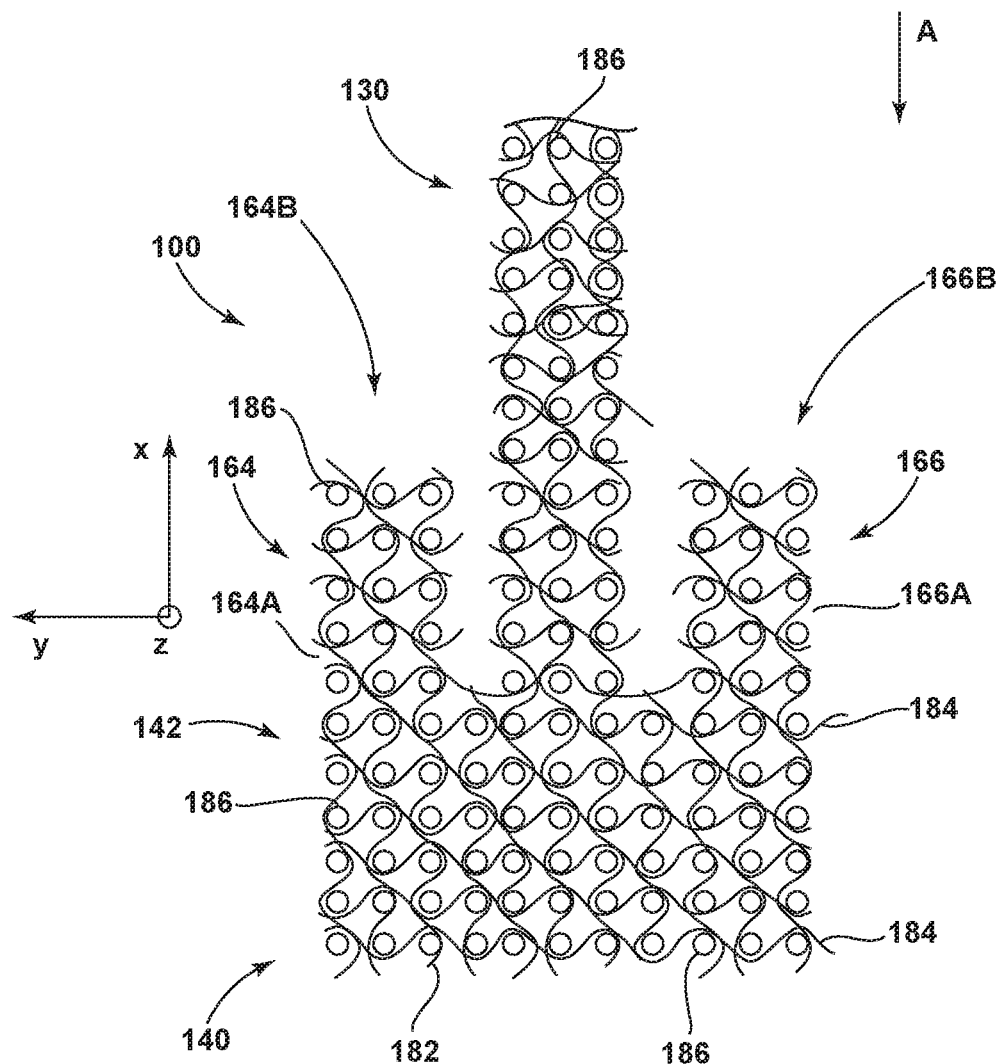
FIG. 3 is a schematic perspective view of a three-dimensionally woven fiber preforms.

FIG. 3 is an embodiment of a portion of a radially outer end of a three-dimensional weave 100 that can be used to create a preform for a turbine engine blade. The preform 100 includes continuous and uninterrupted warp fibers 182 extending along a longitudinal x-direction, continuous and uninterrupted weft fibers 184 extending along a transverse y-direction, and continuous and uninterrupted fibers 186 shown in cross-section and extending along a z-direction normal to the x-direction and y-directions.

An airfoil region 130 of the weave 100 can be made to extend along the longitudinal x-direction and can subsequently be shaped to form an airfoil for the turbine blade.

A root region 140 of the weave 100 widens along the transverse y-direction and includes a tang portion 142, which connects the root region 140 to the airfoil region 130.

An arrangement of flaps 164, 166 extend generally parallel to the airfoil region 130 along the x-direction. The flaps 164, 166 are connected to the airfoil region 130 at a first end 164A, 166A, and include second free ends 164B, 166B.

As shown in more detail below, the flaps 164, 166, which are flexible, can be folded downward along the direction of the arrow A and out of a plane formed by the airfoil region 130 as needed to shape the flaps 164, 166 to form overhangs and create an outer blade platform with a desired shape. In some embodiments, the flaps 164, 166 are folded to form overhangs that occupy a plane substantially normal to the plane occupied by the airfoil region 130.

The preform 100 is a single piece of woven material that can be quickly and consistently produced at a low cost using the three-dimensional weaving apparatus illustrated in FIG. 1. The continuous strands of warp fibers 182 and continuous strands of weft fibers 184 that form the airfoil portion 130 wrap about the z-direction fibers 186 to form an interlocking structure. The interlocking single-piece weave 100 does not include complex joints and seams present in multi-piece interwoven preforms. The joints and seams can concentrate stress and originate cracks in the turbine engine blade during extended periods of service.

Figure 4:
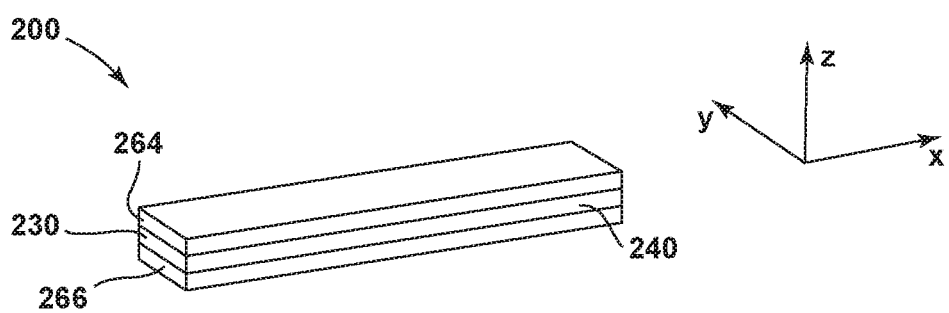
FIGS. 4-5 are schematic perspective views of three-dimensionally woven fiber preforms with flaps forming an inner platform region and a root region.

Referring to the schematic representation in FIG. 4, a three-dimensionally woven turbine engine blade preform 200 includes an airfoil portion 230 extending in the longitudinal x-direction, a flexible first flap 264, a flexible second flap 266, and a root portion 240.

Figure 5:
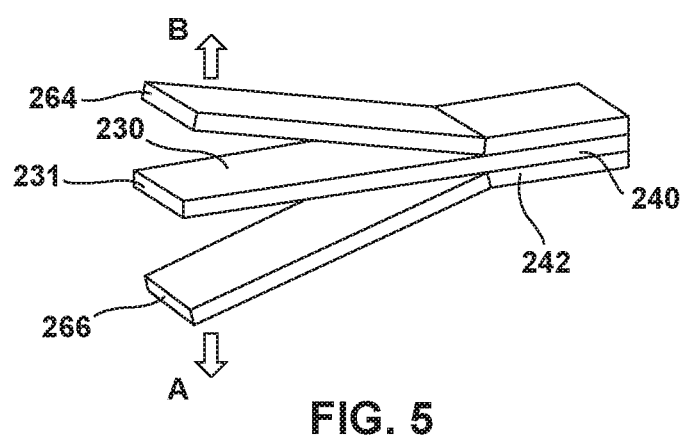

As shown schematically in FIG. 5, the first flap 264 may be folded in the direction of the arrow B, and the second flap 266 may be folded in the direction of the arrow A. Once fully folded, the flaps 264, 266 form overhangs and create an inner blade platform with a desired shape. For example, the flaps 264, 266 can be folded to create an inner blade platform with opposed portions that reside in a plane substantially normal to the plane of the airfoil 230.

In various embodiments, the flaps 264, 266 may include a single layer as shown in FIG. 4, or may include multiple layers to provide an inner blade platform with a desired thickness or shape. In various embodiments, the airfoil portion 230 may include a single layer as shown in FIG. 4, may include multiple layers to provide an airfoil with a desired shape, or may be woven to a specific cross-sectional shape.

As shown in FIG. 5, the root portion 240 has a thickness varying along the z-direction to form a root portion 240 and a tang portion 242, and the thickness of the weave in the z-direction may also be varied to provide a desired cross-sectional shape.

In some embodiments not shown in FIGS. 4-5, the preform 200 may optionally include additional flaps on a second end 231 of the airfoil portion 230 distal the flaps 264, 266. The additional flaps could also be folded and shaped to form an outer platform region (shroud) adjacent the second end 231.

Figure 6:
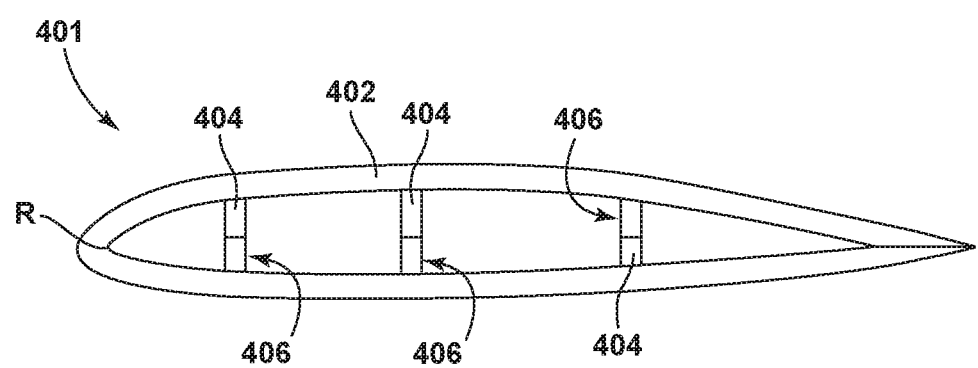
FIG. 6 is a schematic side view of an airfoil blade preform.

In another example illustrated schematically in FIG. 6, a three-dimensionally woven turbine engine airfoil preform 401 includes an elongate region 402 extending along the longitudinal x-direction, and an arrangement of flaps 404 extending along the transverse y-direction. As discussed in detail above, the woven preform 401 can easily be fabricated at low cost in the three-dimensional weaving apparatus of FIG. 1, and is made of a single piece of woven material with continuous warp fibers extending along the x-direction and continuous weft fibers extending along the y-direction, which wrap about continuous fibers extending along the z-direction. The preform 401 can be folded at point R and shaped to form a hollow airfoil with an arrangement of internal supporting ribs 406 formed from mating pairs of flaps 404.

The woven preforms described above can be made from yarns or fibers made from, for example, carbon, glass, silica, silicon carbide, silicon nitride, metals such as aluminum, aramid, aromatic polyamide, and combinations thereof. The fibers can have the same or varying cross-sectional shapes, and can have the same or varying cross-sectional diameters as necessary for a particular application.

The woven preforms can be shaped using appropriately shaped metal tooling or a metal jig, and adhesives such as, for example, polyvinyl acetate (PVA) may optionally be used to maintain the shape of the woven preforms until the preforms are densified to form a CMC part. After the woven preform is attached to the tooling or jig and shaped, an infiltrant selected from Si, C, B, Al, Y, Ti, Zi, oxides thereof, and mixtures and combinations thereof is applied to the woven preform. In various embodiments, the preform is maintained in position by metal tooling or a metal jig during the infiltration process, which at the same time shapes and densifies the preform and creates a CMC part.

The temperature for metal alloy infiltration can vary widely depending on the selected infiltrant. As one example, which is not intended to be limiting, atypical infiltration temperature for Si, is about 1400° C. to about 1500° C. In various non-limiting embodiments, the duration of the infiltration can be between about 15 minutes and 4 hours. In various embodiments, the infiltration process can optionally be carried out under vacuum, but in other embodiments can be carried out in inert gas under atmospheric pressure to limit evaporation losses.

In some embodiments, the matrix material further optionally includes a filler material such as, for example, whiskers, platelets, or particulates having a composition, shape, size, and the like selected to provide desired properties in the final CMC part.

For example, the filler material may be selected to increase the toughness of a brittle matrix of ceramic fibers. The filler may also be chosen to modify thermal conductivity, electrical conductivity, thermal expansion coefficient, hardness, or the like of the CMC part. In some embodiments, the filler composition may be the same as the composition of the fibers making up the ceramic matrix. For example, a silicon carbide matrix may surround silicon carbide fibers. In other embodiments, the filler material may include a different composition than the ceramic matrix, such as aluminum silicate fibers in an alumina matrix, or the like.

In various embodiments, which are not intended to be limiting, some example ceramic materials that may be used in the preform and matrix include ceramics containing Si, such as SiC and $Si_3N_4$; composites of SiC or $Si_3N_4$ and silicon oxynitride or silicon aluminum oxynitride; metal alloys that include Si, such as a molybdenum-silicon alloy (e.g., $MoSi_2$) or niobium-silicon alloys (e.g., $NbSi_2$); and oxide-oxide ceramics, such as an alumina or aluminosilicate matrix with a ceramic oxide fiber such as those available from 3M Co., St. Paul, Minn., under the trade designation NEXTEL 720.

In some embodiments, which are not intended to be limiting, the molten infiltrant wicks between the reinforcing fibers in the preform and forms a matrix that occupies the interstices between the fibers until the preform is fully densified to less than about 10%, or less than about 5%, or less than about 3%, or less than about 1%, porosity.

After infiltration is complete, the resulting final CMC part can optionally be further machined as necessary for a particular application.

Various embodiments of the invention have been described. These and other embodiments are within the scope of the following claims.

The invention claimed is:

1. A method for making a turbine engine blade, comprising:

three-dimensionally weaving elongate fibers of a material selected from the group consisting of carbon, glass, silica, silicon carbide, silicon nitride, aluminum, aramid, aromatic polyamide, and combinations thereof to create a woven preform comprising a single piece of woven material, wherein the woven preform comprises continuous warp fibers extending along a first direction, continuous weft fibers extending along a second direction substantially normal to the first direction, and continuous fibers extending in a third direction substantially normal to the first and the second directions; and wherein the woven preform comprises an airfoil region extending along the first direction and an arrangement of flaps adjacent to the airfoil region extending along the first direction;

forming a shaped woven preform by at least:
   folding and shaping the woven preform to form a hollow airfoil region; and
   folding the arrangement of flaps into a plane substantially normal to a plane of the airfoil region to form an internal supporting rib inside the hollow airfoil region; and densifying the shaped woven preform with a ceramic matrix to obtain a ceramic matrix composite (CMC) turbine engine blade.

2. The method of claim 1, wherein the arrangement of flaps comprises a first pair of flaps, wherein the woven preform further comprises a second pair of flaps disposed at a first end of the airfoil region and a third pair of flaps disposed at a second end of the airfoil region opposite the first end.

3. The method of claim 1, wherein the arrangement of flaps comprise more than one woven layer.

4. The method of claim 1, wherein forming the shaped woven preform further comprises attaching the shaped woven preform to metal tooling prior to the densifying step.

5. The method of claim 1, wherein the densifying step comprises infiltrating the shaped woven preform with an infiltrant selected from the group consisting of Si, C, B, Al, Y, Ti, oxides thereof, and mixtures and combinations thereof.

6. The method of claim 1, wherein the elongate fibers are selected from the group consisting of silica, silicon carbide, silicon nitride, and combinations thereof.

7. A method for making a turbine engine blade, comprising:

three-dimensionally weaving elongate ceramic fibers to create a unitary woven preform comprising continuous warp fibers extending along a first direction, continuous weft fibers extending along a second direction substantially normal to the first direction, and continuous fibers extending in a third direction substantially normal to the first and the second direction; and wherein the woven preform comprises an airfoil region extending along the first direction, a first pair of flaps at a first end of the airfoil region and extending along the first direction, a second pair of flaps at a second end of the airfoil region opposite the first end thereof and extending along the first direction; and a third pair of flaps adjacent the airfoil region;

folding the first pair of flaps into a plane substantially normal to a plane of the airfoil region to form an inner platform region on the first end of the airfoil region;

folding the second pair of flaps into a plane substantially normal to the plane of the airfoil region to form an outer platform region on the second end of the airfoil region;

folding the third pair of flaps into a plane substantially normal to the plane of the airfoil region to form an internal supporting rib;

attaching the folded woven preform to metal tooling prior to the densifying step; and densifying the folded woven preform with a ceramic matrix to obtain a ceramic matrix composite (CMC) turbine engine blade.

8. The method of claim 7, wherein the woven preform further comprises a root region at the first end of the airfoil region.

9. The method of claim 8, wherein the root region further comprises a tang region between the root region and the inner platform region.

10. The method of claim 7, wherein at least one of the first and the second pairs of flaps comprise more than one layer.

11. The method of claim 10, wherein the first pair of flaps comprises at least two layers.

12. The method of claim 7, wherein the densifying step comprises infiltrating the woven preform with an infiltrant selected from the group consisting of Si, C, B, Al, Y, Ti, oxides thereof, and mixtures and combinations thereof.

* * * * *